United States Patent
Hoffmann et al.

(10) Patent No.: US 11,510,258 B2
(45) Date of Patent: Nov. 22, 2022

(54) DIRECT USER EQUIPMENT TO USER EQUIPMENT WITHOUT DATA NETWORK ACCESS IDENTIFIER

(71) Applicant: Nokia Technologies Oy, Espoo (FI)

(72) Inventors: Klaus Hoffmann, Munich (DE); Hans-Jochen Morper, Erdweg (DE)

(73) Assignee: Nokia Technologies Oy, Espoo (FI)

( * ) Notice: Subject to any disclaimer, the term of this patent is extended or adjusted under 35 U.S.C. 154(b) by 78 days.

(21) Appl. No.: 17/049,072

(22) PCT Filed: May 2, 2018

(86) PCT No.: PCT/US2018/030579
§ 371 (c)(1),
(2) Date: Oct. 20, 2020

(87) PCT Pub. No.: WO2019/212543
PCT Pub. Date: Nov. 7, 2019

(65) Prior Publication Data
US 2021/0243826 A1  Aug. 5, 2021

(51) Int. Cl.
H04W 76/14 (2018.01)
H04W 76/11 (2018.01)
H04W 68/00 (2009.01)

(52) U.S. Cl.
CPC ......... H04W 76/14 (2018.02); H04W 68/005 (2013.01); H04W 76/11 (2018.02)

(58) Field of Classification Search
None
See application file for complete search history.

(56) References Cited

U.S. PATENT DOCUMENTS

2007/0036145 A1* 2/2007 Riley .................. H04W 8/04
370/352
2017/0324754 A1* 11/2017 Zhang ................ H04W 12/086

OTHER PUBLICATIONS

3GPP SA WG2 Meeting #120, Mar. 27-31, 2017, Busan, South Korea, S2-172863, "23.501 § 5.6.7: Application Function influence on traffic routing (location information and corrections)", Nokia, et al., 8 pgs.

(Continued)

Primary Examiner — Ajit Patel
Assistant Examiner — Pamit Kaur
(74) Attorney, Agent, or Firm — Harrington & Smith

(57) ABSTRACT

Method, apparatus and computer program product for an application function in a communications network detecting a request from a user equipment for direct peer-to-peer communication with at least one other user equipment, where the direct communication is performed without an application in a data center identified by a data network access identifier, instructing the network to set up said direct communication with the at least one other user equipment gathering information, during establishment/deestablishment of a packet data unit session with user equipment, of the at least one other user equipment participating in the direct communication, and coordinating connectivity between the user equipment and the other participating user equipment based on the received information.

20 Claims, 9 Drawing Sheets

(56) References Cited

OTHER PUBLICATIONS

3GPP TSG SA WG2 Meeting #122, Jun. 26-Jun. 30, 2017, San Jose Del Cabo, Mexico, S2-174435, "TS 23.501: Align PDU session establishment with AF influence on traffic routing and update to DN authorization of PDU session establishment", Huawei, et al., 6 pgs.
3GPP TSG SA WG2 Meeting #123, Oct. 23-Oct. 27, 2017, Ljubljana, Slovenia, S2-177983, "Ts 23.501: AF influenced PDU session establishment and DN authentication/authorization via NEF", Huawei, et al., 6 pgs.

* cited by examiner

DIRECT USER EQUIPMENT TO USER EQUIPMENT WITHOUT DATA NETWORK ACCESS IDENTIFIER

CROSS REFERENCE TO RELATED APPLICATION

This patent application is a U.S. National Stage application of International Patent Application Number PCT/US2018/030579 filed May 2, 2018, which is hereby incorporated by reference in its entirety.

TECHNICAL FIELD

This invention relates generally to fixed networks and/or wireless communication such as 4G, 5G, URLLC, and future advances, and, furthermore, to direct communication without application in a data center (identified by the data network access identifier).

BACKGROUND

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application and is not admitted to be prior art by inclusion in this section.

In 3GPP 5G in TS23501 a new architecture is introduced allowing for a dynamic break out to a local DC identified by an access identifier for the data network.

Please note that TS23501 and TS23502 allow that any UPF with Uplink classifier functionality can be co-located with the e.g. UPF with PDU Session anchor functionality, thus forming a function mostly simply denoted as UL CL UPF. In the literature, Application Function influence on traffic routing is specified, but per definition this is only defined for applications whose traffic is exchanged between the UE and the application in the DC and vice versa. FIG. 1 is a representation of the state of user plane architecture for the uplink classifier.

At the time of this invention, in 5G the SST (Slice/Service type) in the NSSAI (Network slice selection assisting information) implicitly defines the delay as given in the 5QI value in ch. 5.7.4 of TS23501 V1.5.0, e.g. Packet Delay Budget (PDB). In the 5G specification (TS23501, V1.5.0) it is described that the SMF selects the UPF based on the following: UPF's dynamic load; UPF's relative static capacity among UPFs supporting the same DNN; UPF location available at the SMF; UE location information; capability of the UPF and the functionality required for the particular UE session (an appropriate UPF can be selected by matching the functionality and features required for an UE); Data Network Name (DNN); PDU Session Type (i.e., IPv4, IPv6, Ethernet Type or Unstructured Type) and if applicable, the static IP address/prefix; SSC mode selected for the PDU Session; UE subscription profile in UDM; DNAI as included in the PCC Rules and described in clause 5.6.7; local operator policies; S-NSSAI; and access technology being used by the UE.

The max latency for the URLLC are not defined yet in TS23501, but is assumed to be in the ranges between 1 ms and 20 ms.

FIG. 2 is call flow showing the simultaneous relocation of Branching Point or UL CL and additional PSA for a PDU session. At the time of the present invention, the notification to the AF is only possible in case of a DNAI change as can be seen from FIG. 3.

FIG. 3 describes the notification of user plane management event. As can be seen, point 1 shows a condition for an AF notification has been met. As shown in point 2, in case of early notification requested by the AF, the SMF notifies the intended AF of the target DNAI of the PDU Session by invoking Nsmf_EventExposure_Notify service operation. The SMF enforces the change of DNAI or addition, relocation, or removal of a UPF as shown in point 3. Ans, in point 4, in case of late notification requested by the AF, the SMF notifies the AF of the selected target DNAI of the PDU Session by invoking Nsmf_EventExposure_Notify service operation.

The current invention moves beyond these techniques.

Acronyms or abbreviations that may be found in the specification and/or the drawing figures are defined within the context of this disclosure or as follows below:

3GPP Third Generation Partnership Project
5G 5th Generation
5QI 5G QoS Identifier
ACK Acknowledgement
AF Application Function
$AF_{APP}$ AF for an application
$AF_{P2P}$ AF for P2P
APP Application
ARP Allocation and Retention Priority
DC Data Center
BS Base Station
DL Downlink
DNAI Data Network Access Identifier
eMBB enhanced Mobile Broadband
eNB or eNodeB base station, evolved Node B
gNB NR/5G Node B
GRE Generic Routing Encapsulation
ID Identity/Identification
IP Internet Protocol
LLC Low-Latency Constraint
LTE Long Term Evolution
LTE-A Long Term Evolution-Advanced
MME Mobility Management Entity
MSG Message
MTC Machine-Type Communications
NEF Network Exposure Function
NCE Network Control Entity
NR New Radio
P2P Pere-to-Peer
PCC Policy and Charging Control
PDN Packet Data Network
PDU Packet Data Unit
PCF Policy Control Function
PCRF Policy and Charging Control Rules Function
PGW PDN Gateway
PSA PDU Session Anchor
QoS Quality of Service
Rel Release
RE Resource Element
RS Reference Signal
RRC Radio Resource Control
Rx Receive, Reception, or Receiver
(S)AF Specialized AF (which is different from the legacy/existing AF)
SMF Session Management Function
TCO Total Cost of Ownership
TS Technical Specification
TNID Tunnel ID TRP Transmission reception point
Tx Transmit, Transmission, or Transmitter
UCI Uplink Control Information
UE User Equipment
UE-app communication between a UE and an application
UE-UE communication directly between UEs or peer-to-peer
UL Uplink
ULLC Ultra-reliable Low-Latency Communications
UL CL Uplink Classifier
UPF User Plane Function
URLLC Ultra-Reliable Low-Latency Communications

BRIEF SUMMARY

This section is intended to include examples and is not intended to be limiting. The word "exemplary" as used herein means "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

An example of an embodiment of the current invention, which can be referred to as item 1, is a method that comprises detecting in a communications network, by an application function, a request from a user equipment for direct peer-to-peer communication with at least one other user equipment, where the direct communication is performed without an application in a data center identified by a data network access identifier; instructing the network, by the application function, to set up said direct communication with the at least one other user equipment; gathering information, by the application function, during establishment/deestablishment of a packet data unit session with user equipment, of the at least one other user equipment, participating in the direct communication; and based on the received information, coordinating connectivity by the application function between the user equipment and the other participating user equipment.

An example of yet another embodiment of the current invention is a computer program product embodied on a non-transitory computer-readable medium in which a computer program is stored that, when being executed by a computer, instructs the computer to perform by enacting code for detecting in a communications network, by an application function, a request from a user equipment for direct peer-to-peer communication with at least one other user equipment, where the direct communication is performed without an application in a data center identified by a data network access identifier; code for instructing the network, by the application function, to set up said direct communication with the at least one other user equipment; code for gathering information, by the application function, during establishment/deestablishment of a packet data unit session with user equipment, of the at least one other user equipment, participating in the direct communication; and code for coordinating connectivity by the application function between the user equipment and the other participating user equipment based on the received information.

An example of another embodiment of the current invention is an apparatus comprising: means for detecting in a communications network, by an application function, a request from a user equipment for direct peer-to-peer communication with at least one other user equipment, where the direct communication is performed without an application in a data center identified by a data network access identifier; means for instructing the network, by the application function, to set up said direct communication with the at least one other user equipment; means for gathering information, by the application function, during establishment/deestablishment of a packet data unit session with user equipment, of the at least one other user equipment, participating in the direct communication; and means for coordinating connectivity by the application function between the user equipment and the other participating user equipment based on the received information.

An example of another embodiment of the current invention is an apparatus comprising: at least one processor and at least one memory including computer program code, where the at least one memory and the computer code are configured, with the at least one processor, to cause the apparatus to at least perform the following: detecting in a communications network, by an application function, a request from a user equipment for direct peer-to-peer communication with at least one other user equipment, where the direct communication is performed without an application in a data center identified, by a data network access identifier; instructing the network, by the application function, to set up said direct communication with the at least one other user equipment; gathering information, by the application function, during establishment/deestablishment of a packet data unit session with user equipment, of the at least one other user equipment, participating in the direct communication; and based on the received information, coordinating connectivity by the application function between the user equipment and the other participating user equipment.

BRIEF DESCRIPTION OF THE DRAWINGS

In the attached Drawing Figures.

DETAILED DESCRIPTION OF THE DRAWINGS

Figure 1:
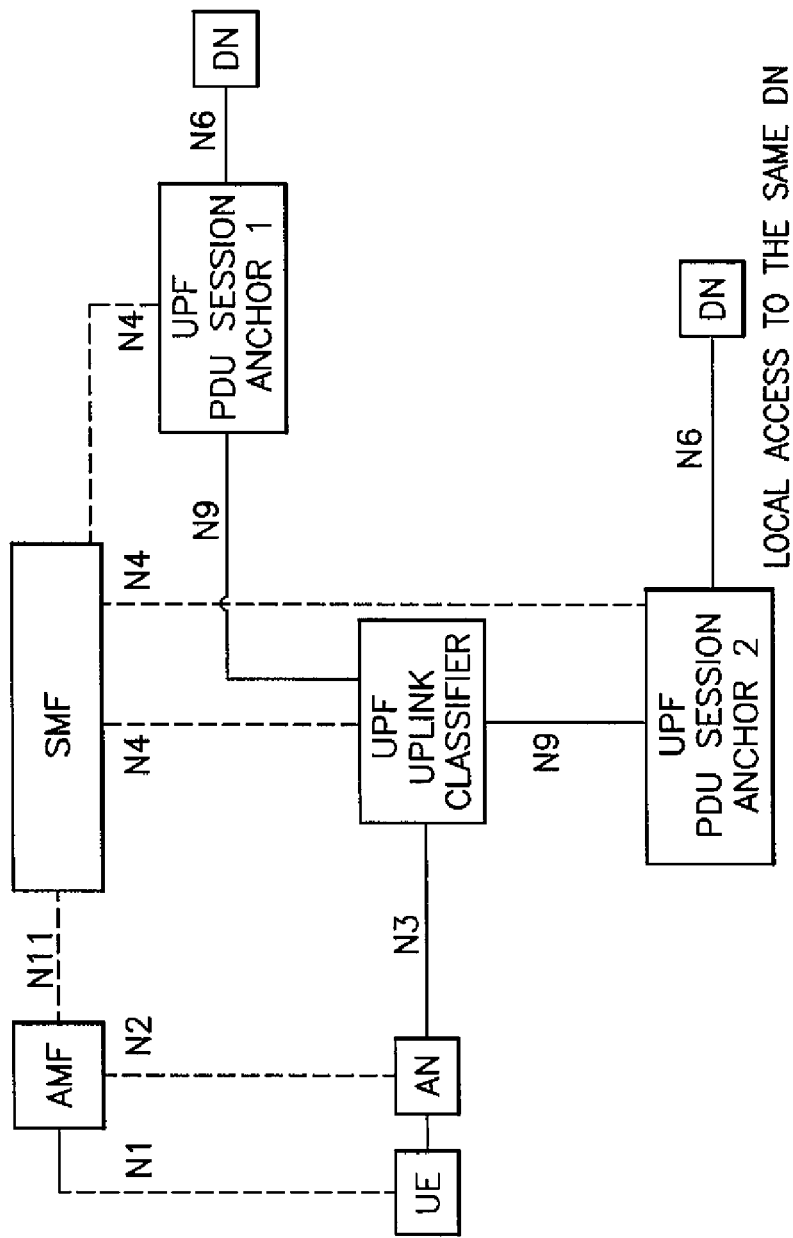
FIG. 1 is a diagram of user plane architecture for the uplink classifier.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

While the current invention can be applied to fixed networks as well as wireless networks or some combination of the two, where one participant in the communication uses a wireless UE while another participant is attached to a fixed or wired network (as for instance with wireless or landline UEs communicating with computers via the cloud), most the examples given herein are directed to wireless communications. Nonetheless, the invention can be applied to wired networks.

AF influence on traffic routing is heavily based on the DNAI concept. This is based on the assumption that there is always Application Software running in the DC of the DNAI, where all the payload from the UE is sent to the application residing in a DC identified by the DNAI and from there to the partner UE, such that a direct communication between UE and UE has not yet been considered. As a result, sending the traffic always to the DC increases overall traffic and delay.

In general the location of the DNAI and the delay requirement implicitly defines a set of tracking areas within which a UE is to be connected via certain UPF to the DNAI. However, within a direct UE-UE communication without any Application in the DC in the DNAI, a stringent latency requirement also exists and max end-to-end delay need to be adhered to. It is to be noted that in case no application is needed in the DC, bypassing the APP in the DC the latency can be further decreased and user experience can be increased.

The network will select a user plane function fulfilling latency requirements of the service. Nonetheless, the user plane communication between the peer to peer communication between the UE is directly across the networks (via the UPF) whereas the control plane of the peer to peer application is still via the data center.

The max latency for the URLLC has not yet been defined in TS23501, but is assumed to be in the ranges between 1 ms and 20 ms. Based on this information for a PDU session, for instance, in a dedicated URLLC slice, the SMF shall allocate at least the anchor UPF (e.g. TS23502 ch. 4.3.2.2.1 based on the authorized 5QI/ARP (possibly beside other information elements) received from the PCF) and afterwards could add an additional anchor and ULCL (e.g. TS23502 ch. 4.3.5.4) and/or remove an additional anchor and UL CL UPF (e.g. TS23502 ch. 4.3.5.5).

As mentioned the authorized 5QI/ARP being part of the QoS parameter sent by the PCF/PCRF to the SMF/PGW-C contains the delay already. That means the SMF/PGW-C shall make use of the max delay not only during PDU session establishment but even later on to add and/or relocate the UP CL UPF, because of UE mobility.

At the time of this invention, the traffic steering is based on the DNAI to which for each service a certain list of tracking area(s) (TA) is assigned, such that the PCF/SMF holding this correlation can select an appropriate UPF UL CL. However, in direct UE-UE communication without DNAI, the SMF shall base the selection of the UPF UL CL on the associated maximum delay for the service and shall maintain the required maximum delay during the life time of the service.

As there are already sequence charts in the TS 23502, these procedures take care for the adding, removal, and replacement of UPF ULCL in general. However, it remains unclear how the remote participants get notified about the relocation/adding or removal of the UPF UL CL of the local user and how to maintain service continuity in this case of a direct UE to UE communication without application in a DNAI. Simple AF and APP, where the payload is always exchanged between the UE and the application in the cloud, is augmented such that it is capable to simultaneously support peer-to-peer applications on the involved UEs.

A type of application function is the special AF, which is different from the normal/legacy AF.

In principle, it is suggested that a new kind of "Specialized AF" (S)AF/$AF_{P2P}$ be created, related to applications that do not necessarily need an application in the DC/DNAI, because the application is running solely in the UE. Such an AF, which can distinguish between UE-app and UE-UE communication, if it acts as an AF for direct UE-UE communication then it can directly exchange the signaling between the SMF of one UE with the session management function of any other authorized UE.

Figure 7:
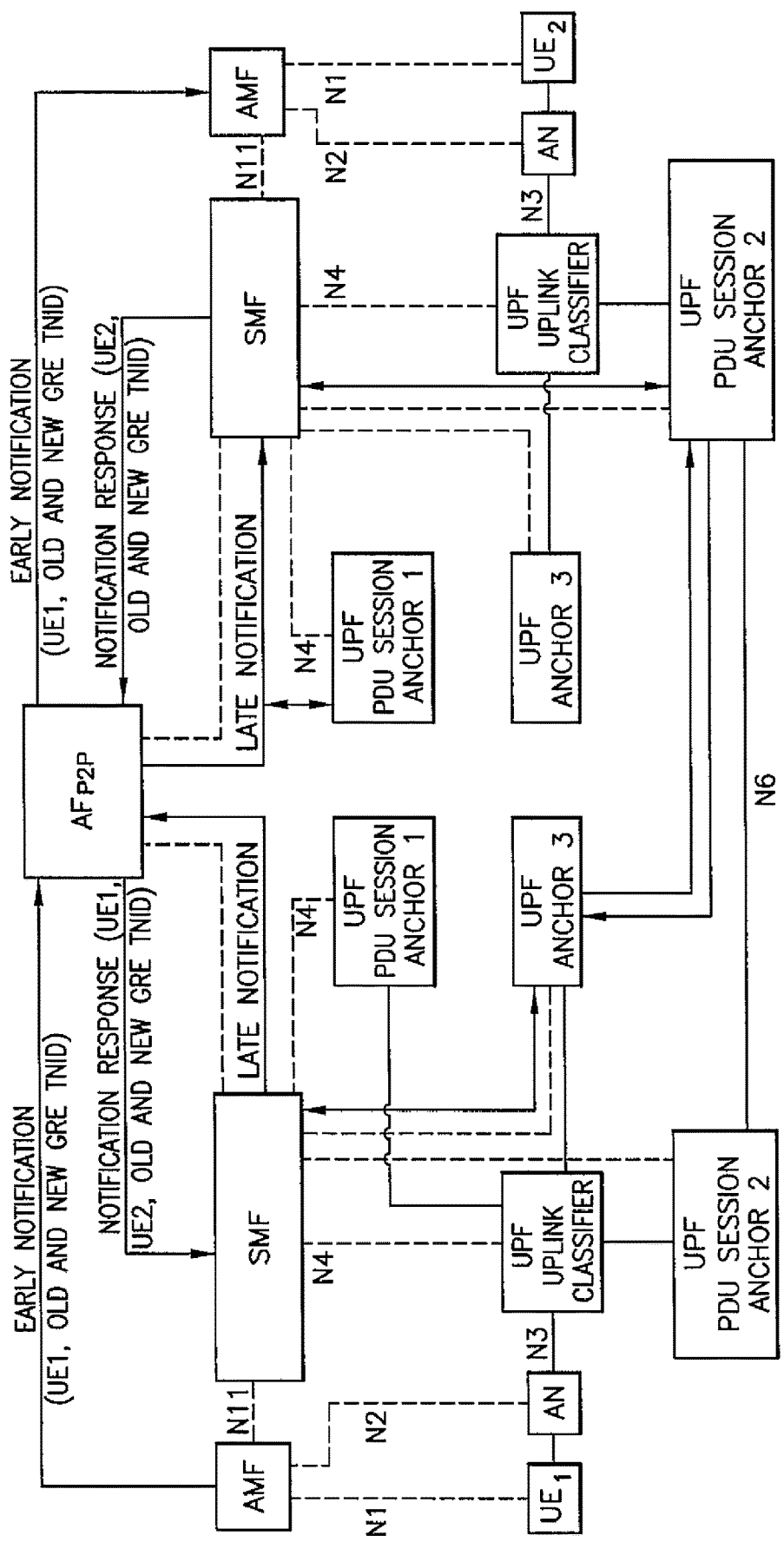
FIG. 7 is a schematic of an exemplary embodiment of an apparatus of the present invention.

Features in SMF in this invention are novel as well. The SMF shall be able to notify the special AF about UPF relocation without any DNAI and with, for example, potentially multiple tunnel endpoint and/or simple IP and/or MAC address. Furthermore, an additional security feature could be deployed as a new policy in the networks and especially in the SMF-UPF and/or SGW-C/PGW-C and SGWU/PGW-U to accept packets from the new GRE Tunnel ID of the $UE_1$ only in case the $AF_{P2P}$ or the network policy authorized to do so. That means the interface between SMF and UPF on one side and/or between SGW-C/PGW-C and SGW-U/PGW-U on the other side is augmented with an additional indication to allow or not allow to receive packets from the remote side. Without DNAI in particular means that as shown in FIG. 7 (discussed in more detail below) that the SMF, responsible for the UPF of the UE, sends the e.g./i.e. early notification without the DNAI to the $AF_{P2P}$ and that the $AF_{P2P}$ maps or translates the Notification into an AF request being sent by the $AF_{P2P}$ towards the SMF which also does not contain the DNAI.

Therefore, the two SMFs shall be able to be configured/programmed to send Notification without DNAI in case of a relocation of the UPF (e.g. on the side of the $UE_1$) and to accept the newly defined AF request also even without DNAI (e.g. on the side of the $UE_2$), but at least with a dedicated tunnel ID or IP address or MAC address, being able to identify the peer UPFs transport endpoint for the UE in question, because this is for the direct point to point Application.

Note that in one example, this configuration/programming at the SMF as mentioned above may be performed based on a new information element being sent from the $AF_{P2P}$ towards the SMF. Note, too, that a transport endpoint could be IPv6, IPv4 and MAC addresses or similar. Communication paths may include Multiprotocol Label Switching (MPLS), Virtual LAN (VLAN), etc.

The SMF of the $UE_2$ shall be allowed to respond with a changed dedicated tunnel ID or IP address or MAC address towards the $AF_{P2P}$. The $AF_{P2P}$ in turn maps or translates the response into an AF request being sent by the $AF_{P2P}$ towards the SMF of the $UE_1$. By this procedure it is ensured that both networks only allow the communication between the two authorized UPFs, once the peers transport endpoints have been exchanged. That means especially, for instance, that as shown in FIG. 7 (discussed in more detail below), the incoming early notification is mapped by the $AF_{P2P}$ to a newly defined outgoing "early notification" towards the SMF controlling the UPF of the partner $UE_2$. Therefore the SMF is impacted to accept this new message, whether being directly received as sent by the $AF_{P2P}$ or via the NEF/PCF/PCRF.

Alternatively, instead of always keeping the AF in the path, the participating SMFs may directly signal notifications (adding, removing, relocating of UL CL UPF anchor) to their peering SMFs. That could be allowed by the $AF_{P2P}$, when the $AF_{P2P}$ forwards the (IP) address of the control plane of the remote "SMFs" of the participating UEs. The $AF_{P2P}$ may subscribe to each of the SMF to be notified when a SMF may have changed, such that the $AF_{P2P}$ is always is aware of the responsible SMF in order to be able to terminate any UE session, if needed.

In another example if the UPFs of the SMF of the $UE_2$, $UE_2$ and $UE_n$ would have been configured to always accept packets from any UPF of the UPFs of the SMF of $UE_1$ then only the late notification may be feasible. That means, for instance, that the SMF of $UE_1$ shall perform the relocation of the UL CL UPF without sending the early notification and shall send the late notification with the UE $ID_1$ and its (new, modified) local GRE Tunnel ID to the $AF_{P2P}$ just after successful completion of the relocation.

In the case the $AF_{P2P}$ is suggested to forward this information to the SMF of the UE2 and the UPFs of the $UE_2$, $UE_3$ and $UE_n$ are instructed to forward their uplink traffic to the new UL CL UPF anchor of the SMF of the $UE_1$. In that case, additional to the example of FIG. 7 (discussed in more detail below), the SMFs are configured/programmed to pre-configure their UPFs such that they accept user plane packet from any sources.

Figure 8:
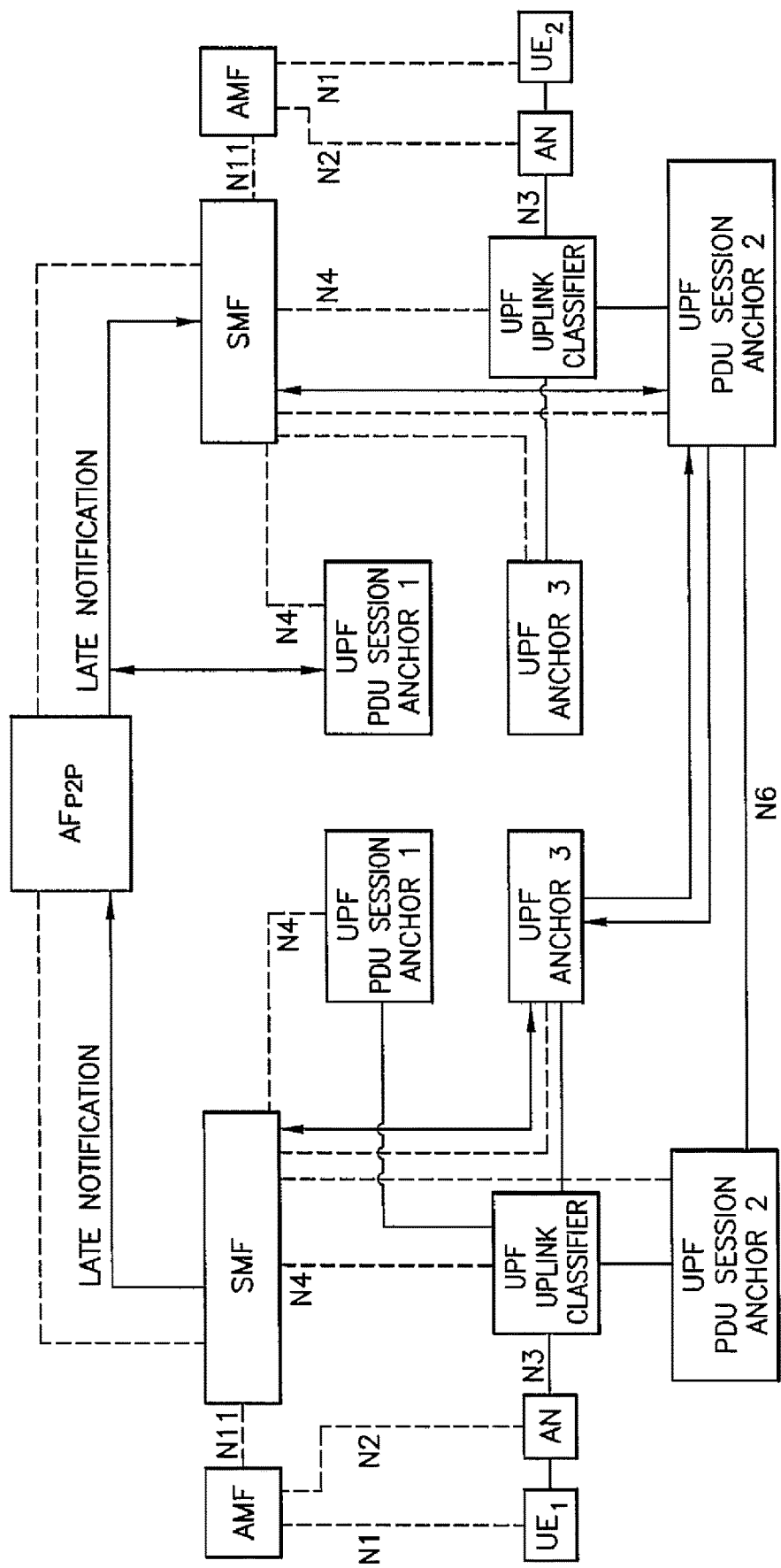
FIG. 8 is a schematic of an other exemplary embodiment of an apparatus of the present invention.

The example related to FIG. 7, discussed in more detail below, would provide enhanced and secure use experience, as it is excluded that unauthorized packets can get injected like it might be possible in the example related to the FIG. 8, also discussed in more detail below.

Figure 4:
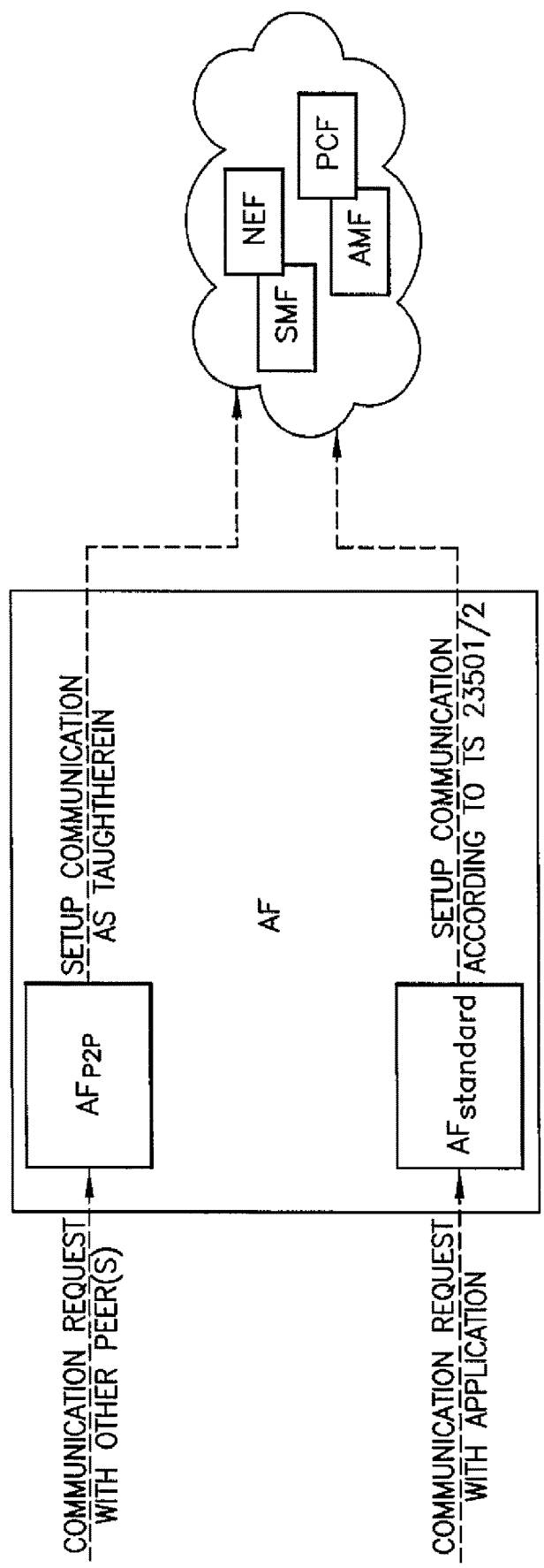
FIG. 4 represents an application function distinguishing between UE-app and UE-UE communication.

FIG. 4 shows an application function distinguishing between UE-app and UE-UE communication in accordance with the present invention.

Depending on the indication implicitly or explicitly sent to the AF, the AF distinguished whether the AF acts as the traditional/standard AF as defined in the 3GPP specifications TS23501 and 23502 or whether the AF shall act as an $AF_{P2P}$ in accordance with description of this invention.

Figure 5:
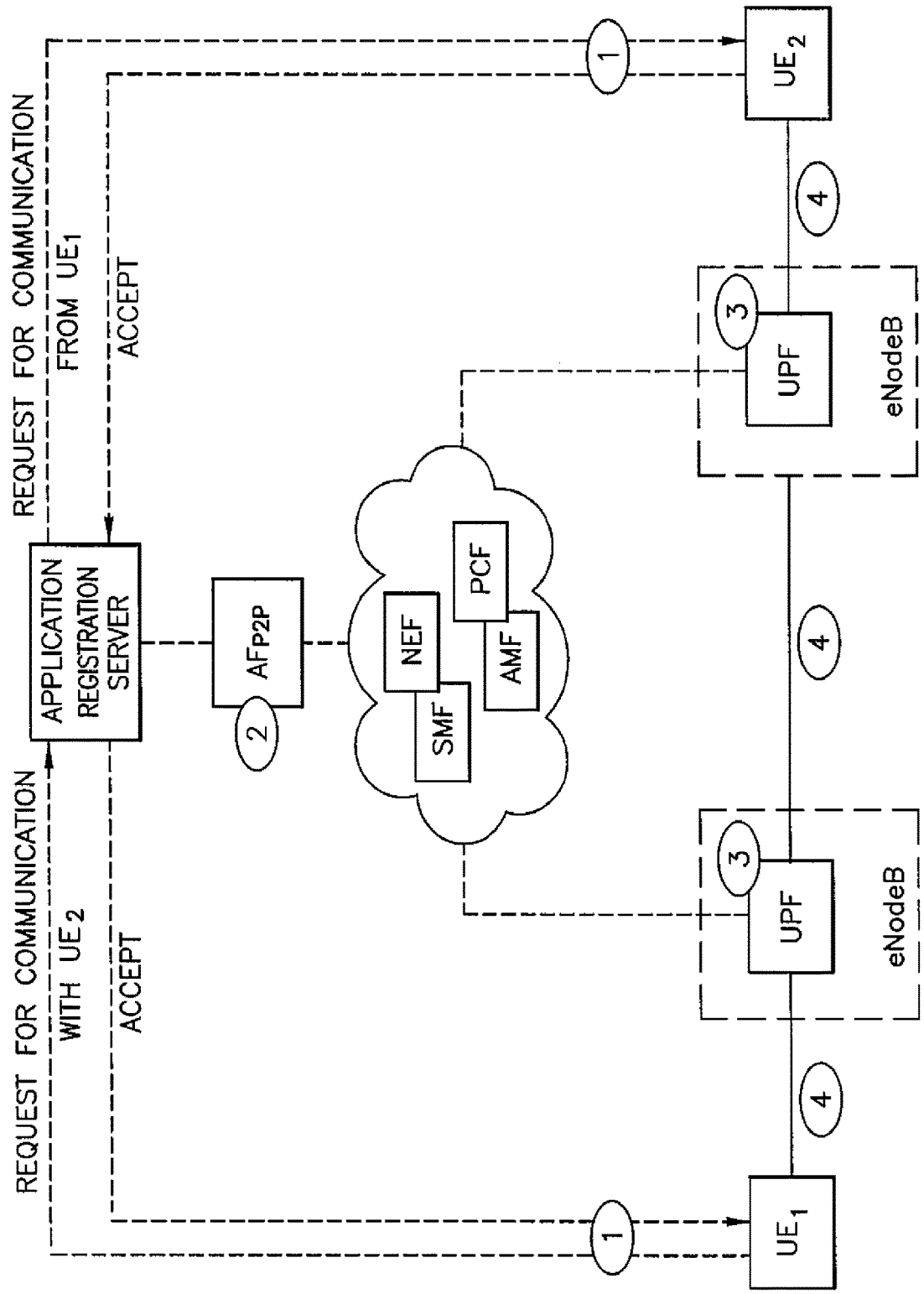
FIG. 5 represents $AF_{P2P}$ placing UPFs close the ingress/egress points.

The $AF_{P2P}$ of the current invention shall be able to request to be notified about any change of the service UPF (UL CL/PB and or etc.), which also includes the registration, the deregistration to the service by the UE, and the allocation, re-allocation, and removal of the UPF. FIG. 5 shows that the $AF_{P2P}$ will place UPFs close to the wireless ingress/egress points, eNBs.

With the registration/de-registration, the $AF_{P2P}$ will be kept informed about the participants of the service (e.g. game, etc.) and their relationship (e.g. V2X platoon, cross road traffic risk group, etc.) as depicted in the steps 1 and 2, respectively, of FIG. 5.

Furthermore, the network is instructed (implicitly or explicitly) by the $AF_{P2P}$ to select the UPF fulfilling the, for instance as shown by step 3 in FIG. 5, latency requirements for the service in question and, as shown in step 4 of FIG. 5, the $AF_{P2P}$ will be informed about the related tunnel IDs of the UPFs connected to the UEs during establishment of the PDU session for each participating UE such that the $AF_{P2P}$ will coordinate the connectivity between the participating UEs.

Whenever a UPF is changed, the $AF_{P2P}$ is notified and, in turn, the $AF_{P2P}$ forwards this notification to the other UPF peers of the UPF application. $AF_{P2P}$ keeps track of the UE connected and their UE IDs, IP address tunnel IDs so that it is suggested that the $AF_{P2P}$ swap/exchange the UE IDs when mediating between the participating UEs. In this way, the other participants become aware of the new UPF and are instructed by the $AF_{P2P}$ to accept and forward their payload to the new location. Naturally, whenever such as is started in the UE, the $AF_{P2P}$ is notified about the new participant. Moreover, a tunnel may just be an example because the connection may be made, for instance, with a simple IP and/or MAC addresses, VLAN tags, etc.

Thus, described herein per the current invention is an introduction of a direct UE-UE communication without an application in the U-plane; an application function distinguishing between UE-app and UE-UE communication and applying different UPF location procedures; and placement by the AF (or $AF_{P2P}$) of UPFs close to the wireless ingress/egress, such as at eNodeBs.

Figure 6:
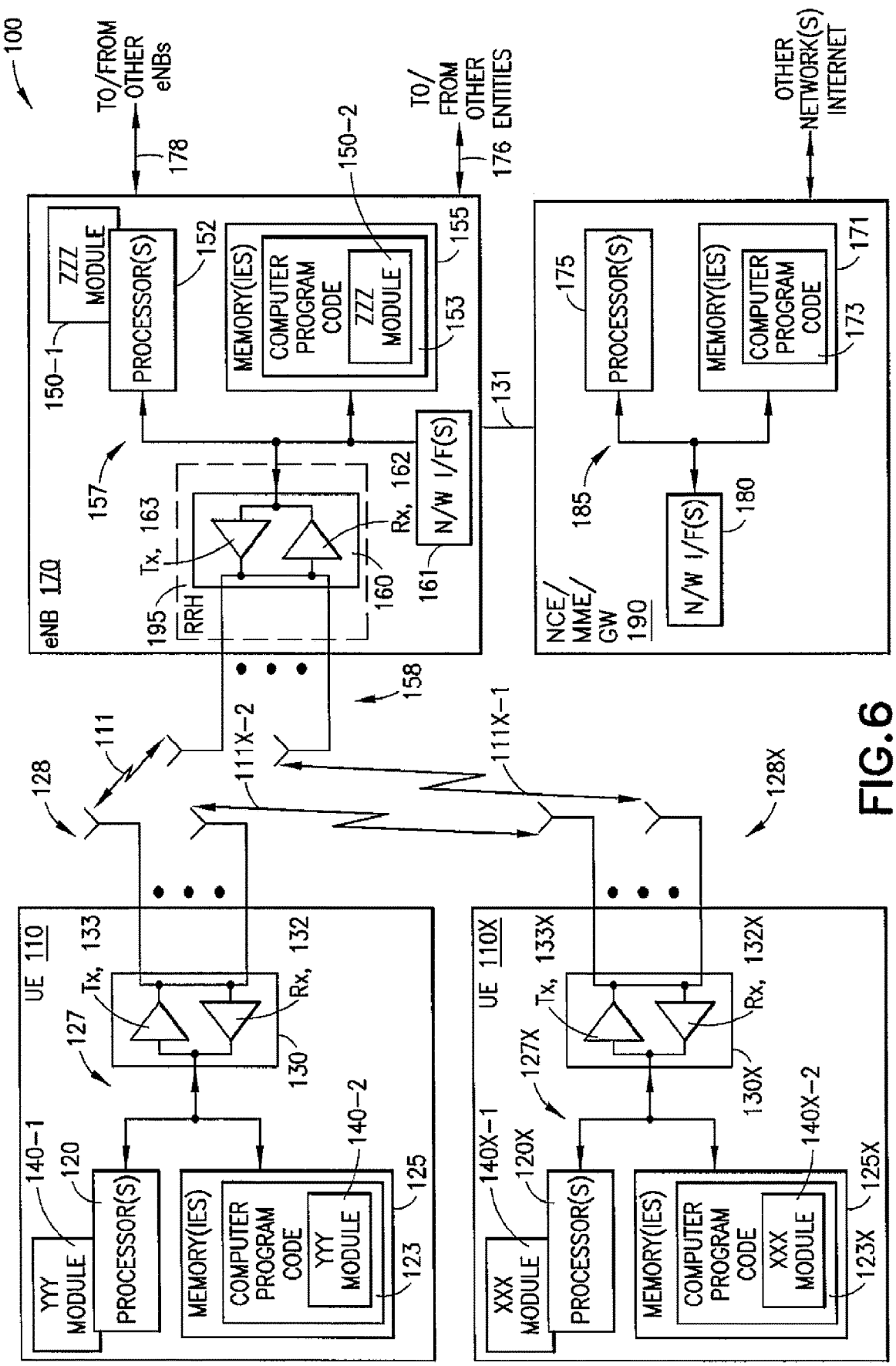
FIG. 6 is a block diagram of an exemplary system in which the exemplary embodiments may be practiced.

Before turning to how an exemplary embodiment would function, FIG. 6 is presented showing a block diagram of one possible and non-limiting exemplary system in which the exemplary embodiments may be practiced. In FIG. 6, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a YYY module 140, comprising one of or both parts 140-1 and/or 140-2, which may be implemented in a number of ways. The YYY module 140 may be implemented in hardware as YYY module 140-1, such as being implemented as part of the one or more processors 120. The YYY module 140-1 may be implemented also as an integrated circuit or through other hardware such as a programmable gate array. In another example, the YYY module 140 may be implemented as YYY module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with base station 170 via a wireless link 111.

The base station 170 (which in the shown embodiment is a gNB or NR/5G Node B but possibly an evolved NodeB for LTE, long term evolution, but could be any similar access point to a wireless network) that provides access by wireless devices such as the UE 110 to the wireless network 100. The base station 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The base station 170 includes a ZZZ module 150, comprising one of or both parts 150-1 and/or 150-2, which may be implemented in a number of ways. The ZZZ module 150 may be implemented in hardware as ZZZ module 150-1, such as being implemented as part of the one or more processors 152. The ZZZ module 150-1 may be implemented also as an integrated circuit or through other hardware such as a programmable gate array. In another example, the ZZZ module 150 may be implemented as ZZZ module 150-2, which is implemented as computer program code 153 and is executed by the one or more processors 152. For instance, the one or more memories 155 and the computer program code 153 are configured to, with the one or more processors 152, cause the base station 170 to perform one or more of the operations as described herein. The one or more network interfaces 161 communicate over a network such as via the links 176 and 131. Two or more base stations 170 communicate using link 178, while the base station can communicate with other entities via link 176, where both link 176, sand 178 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the base station 170 being physically in a different location from the RRH, and the one or more buses 157 could be implemented in part as fiber optic cable to connect the other elements of the base station 170 to the RRH 195.

Turning to another user equipment, as depicted in FIG. 6 there is a UE 110X also in wireless communication with a wireless network 100. The user equipment 110X includes one or more processors 120X, one or more memories 125X, and one or more transceivers 130X interconnected through one or more buses 127X. Each of the one or more transceivers 130X includes a receiver, Rx, 132X and a transmitter, Tx, 133X. The one or more buses 127X may be address, data, or control buses, and may include any interconnection mechanism, such as a series of lines on a motherboard or integrated circuit, fiber optics or other optical communication equipment, and the like. The one or more transceivers 130 are connected to one or more antennas 128X. The one or more memories 125X include computer program code 123X.

The UE 110X includes an XXX module 140X, comprising one of or both parts 140X-1 and/or 140X-2, which may be implemented in a number of ways. The XXX module 140X may be implemented in hardware as XXX module 140X-1, such as being implemented as part of the one or more processors 120X. The XXX module 140X-1 may be implemented also as an integrated circuit or through other hardware such as a programmable gate array. In another example, the XXX module 140X may be implemented as XXX module 140X-2, which is implemented as computer program code 123X and is executed by the one or more processors 120X. For instance, the one or more memories 125X and the computer program code 123X may be configured to, with the one or more processors 120X, cause the user equipment 110X to perform one or more of the operations as described herein. The UE 110X communicates with eNB 170 via a wireless link 111X-1. The remote UE 110 communicates with the relay UEs 110X via a wireless link 111X-2.

Here UE 110 could represent a first UE, while a second UE could be denoted as 110X in this diagram.

It is noted that description herein indicates that "cells" perform functions, but it should be clear that the eNB that forms the cell would perform the functions. The cell makes up part of an eNB. That is, there can be multiple cells per eNB. For instance, there could be three cells for a single eNB carrier frequency and associated bandwidth, each cell covering one-third of a 360-degree area so that the single eNB's coverage area covers an approximate oval or circle. Furthermore, each cell can correspond to a single carrier and an eNB may use multiple carriers. So if there are three 120-degree cells per carrier and two carriers, then the eNB has a total of 6 cells.

The wireless network 100 may include a network control element (NCE) 190 that may include MME (Mobility Management Entity)/SGW (Serving Gateway) or AMF, SMF and UPF functionality, and which provides connectivity with a further network, such as a telephone network and/or a data communications network (e.g., the Internet). The base station 170 is coupled via a link 131 to the NCE 190. The link 131 may be implemented as, e.g., an Si interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 125X, 155 and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 120X, 152, and 175 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 and user equipment 110X can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. For example, in an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, as in FIG. 6 for example. A computer-readable medium may comprise a computer-readable storage medium (e.g., memories 125, 125X, 155, 171 or other device) that may be any media or means that can contain or store the instructions for use by or in connection with an instruction execution system, apparatus, or device, such as a computer.

The current architecture in LTE networks is fully distributed in the radio and fully centralized in the core network. The low latency requires bringing the content close to the radio which leads to local break out and multi-access edge computing (MEC). 5G may use edge cloud and local cloud architecture. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services and augmented reality. In radio communications, using edge cloud may mean node operations to be carried out, at least partly, in a server, host or node operationally coupled to a remote radio head or base station comprising radio parts. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

One possible manner to carry out embodiments described herein is with an edge cloud using a distributed computing system. An exemplary embodiment comprises a radio node connected to a server. Exemplary embodiments implementing the system allow the edge cloud server and the radio node as stand-alone apparatuses communicating with each other via a radio path or via a wired connection or they may be located in a same entity communicating via a wired connection.

Note that the current internal structure of the other elements of the communications system shown in other figures herein will have similar processor, memory, transceiver, etc. structures, with computer programs in modules controlling their function and interacting with the other elements in the system.

FIG. 7, showing a system with additional elements to two UEs and a base station, illustrates UPF of $UE_1$ and $UE_2$ needing to change, for example, their Generic Routing Encapsulation (GRE) Tunnel ID.

Even in case the apps on the UE communicate directly with each other, the $AF_{P2P}$ is introduced, which keeps track of the interacting UEs. It is suggested that this $AF_{P2P}$ for each participating UE can request to be notified even without DNAI change when the SMF inserts, removes and adds a ULCL UPF even without issuing a DNAI in the AF request.

In other words, the application function described here is distinguishable from an application function used for an application. Specifically, this peer-to-peer or end-to-end application function, has the functionality of an application function built into it, particularly with respect to doing a handshake for instance with a 5G core network or a 4G network. So from the point of view of a 5G core network, the P2P AF appears as an application function. On the other hand, from a UE's point of view, the application function appears as an application used to setup peer-to-peer connections (registration/deregistration, establishment/de-establishment).

As seen from FIG. 7, $UE_1$ is on the left and $UE_2$ is on the right. It is to be noted that $UE_1$ and $UE_2$ may be subscribed and attached to different PLMNs. At a certain point in time, the initial UPF Anchor 2 and the UPF with UL CL were selected by the SMF and UE payload traffic was exchanged between the UPF Anchor 2 and the corresponding UPF of the $UE_2$ on the right-hand side. Since there is no DNAI in this scenario, it is suggested that the QoS parameter, signaled by the PCF to the SMF, is evaluated by the PCF/SMF in order to detect that the delay between the UE and the current UPF may become too high. In that case, it is suggested that the SMF triggers the relocation.

The $AF_{P2P}$ instructs the network to set up the UE-UE communications as the $AF_{P2P}$ is located in the data center and instructs the network via NEF/PCF or directly to the SMF or the PGW-C in case of 4G.

Due to $UE_1$'s mobility, the SMF (on the left) may need to relocate the UPF UL CL and UPF 2 to the UPF UL CL and UPF Anchor 3 because the combined UPF UL CL/UPF Anchor 3 fulfils the latency requirement for the UE's location for the UE service. Please note the arrow indicating early and late notification in FIG. 7.

When the SMF-A1 decides that a UL CL UPF/UPF Anchor 2 is to be relocated, added, and/or removed to, for example, a UL CL UPF/UPF Anchor 3, the SMF1 shall send the (early) Notification to the special AF (SAF) with the UE ID1 and its (new or modified) local GRE Tunnel ID. This would be, for instance, in FIG. 2 after step 1 (path switch) and before step 2 (SMF establishes Target UPF). The SMF-A1 awaits the response from the AF.

The $AF_{P2P}$ checks which other UEs are interacting with the UE in question and sends an AF message to the NEF/PCF/SMF of the participating UEs ($UE_2$, $UE_2$ and $UE_n$) (maps the information) telling them to be prepared to send their uplink packets to the new GRE Tunnel ID for the IP address of the $UE_1$ and to accept packets from the new GRE Tunnel ID of the $UE_1$.

This shall be signaled from the $AF_{P2P}$ to the NEF to the PCF to the SMF-B2 to the UPF of the $UE_2$, $UE_3$, $UE_n$ via a combination of a standardized traffic steering information element (e.g. NAT/GRE) and redirection request for each participating $UE_2$, $UE_3$ and $UE_n$ etc.

On receipt, potentially the SMF/UPF can allocate a new GRE Tunnel ID (might be needed in case of encryption) for the $UE_2$, $UE_3$ and $UE_n$, which shall be responded back to the AF. The $AF_{P2P}$ then sends this information via the NEF/PCF/SMF-A1 to the UL CL UPF of the $UE_1$.

Figure 2:
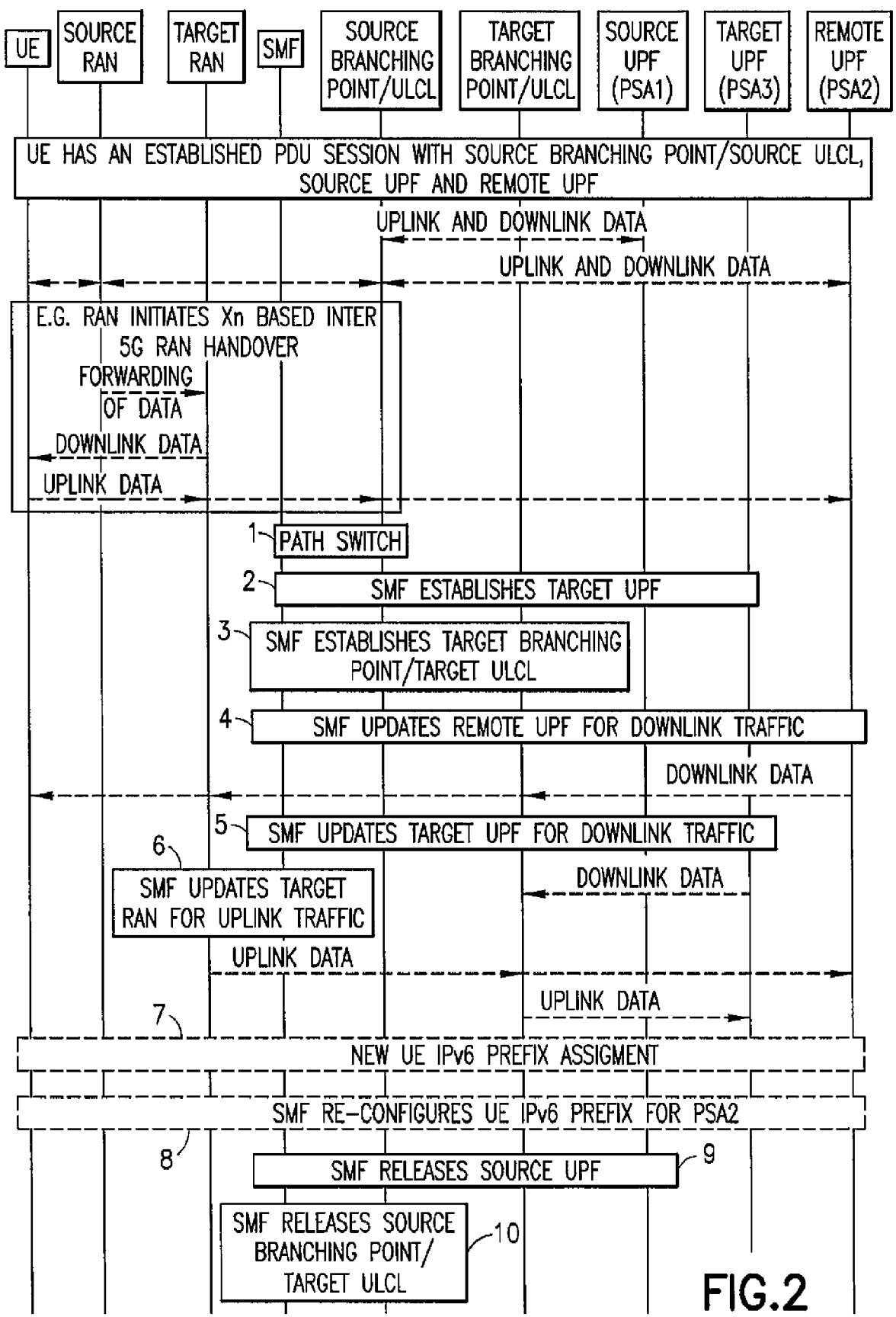
FIG. 2 is call flow showing the simultaneous relocation of Branching Point or UL CL and additional PSA for a PDU session.
Figure 3:
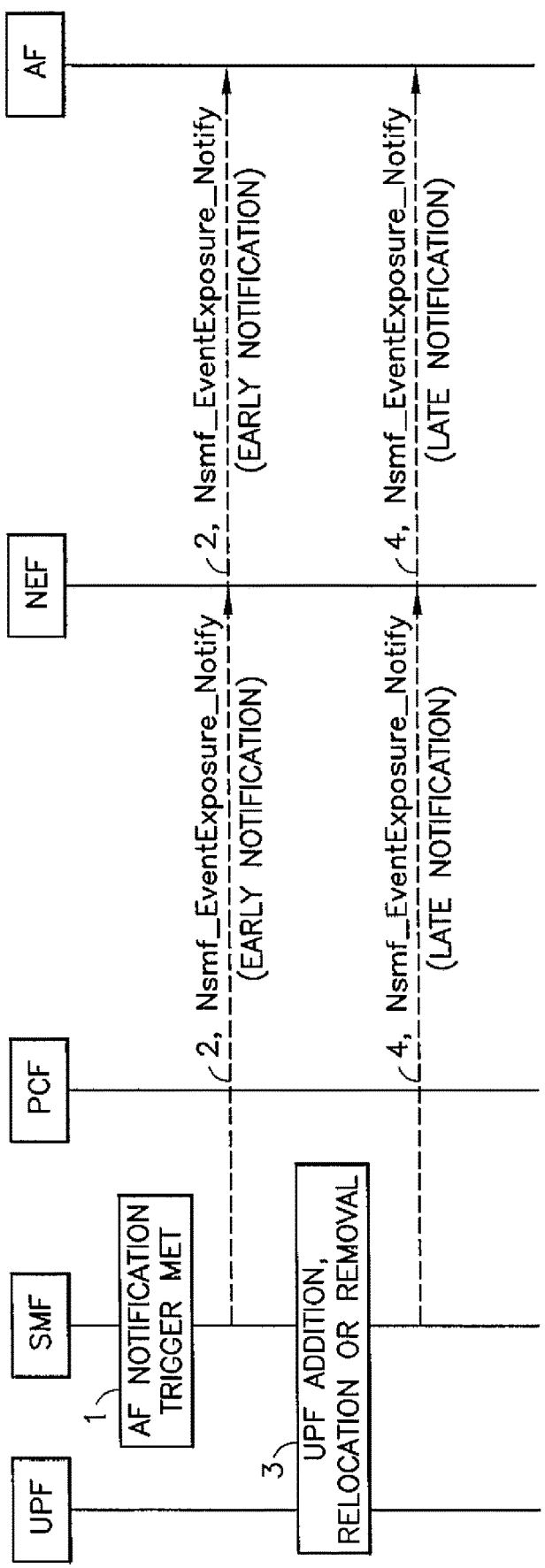
FIG. 3 is call flow diagram of the notification of a user plane management event.

After the receipt of the $AF_{P2P}$ response at the SMF-A1 and the corresponding completion of, as as shown in FIG. 2, steps 3 and step 4 (updates Remote UPF), the SMF-A1 continues with step 5 (updates Target UPF for down link) by additionally signaling, for instance, the remote GRE Tunnel IDs of the UL CL UPFs of SMF-B2 of the $UE_2$, $UE_3$ and the $UE_n$ to the target UPF and on successful completion of the step 6 (updates target RAN for uplink) the SMF-A1 sends late notification to the (S)AF. The (S)AF maps the information and forwards this information to the SMF-B2 of the UL CL UPF of the $UE_2$, $UE_3$. On receipt of the information at the SMF-B2 that relocation had been completed at the $UE_1$ side, the UPF UL CL of the $UE_2$ starts forwarding the packets to the new target UL CL UPF on the $UE_1$ side.

Regarding reordering at the $UE_2$/$UE_3$, optionally, in order to ensure reordering of the ($UE_2$, $UE_3$, $UE_n$) uplink traffic the UPF of the $UE_2$, $UE_3$ and $UE_n$ are instructed by the SMF-B2 to send an indication in the GRE tunnel (optionally also a sequence number may be introduced) to the UPF of the $UE_1$ that packets are sent to the new UL CL of the $UE_1$. After a certain time period this indication can be ceased being sent.

The source UL CL UPF of the UE on receipt of the indication in the GRE tunnel will not forward the packets anymore to the target UL CL of the $UE_1$ as the remote UPF of the $UE_2$, $UE_3$ will send packets to the target UL CL UPF. Note that this same procedure may also be applied on the $UE_1$ side for $UE_1$ uplink traffic.

Optionally the e.g. GRE tunnel endpoint might not be needed to be changed. Turning to FIG. 8, UPF of $UE_2$, $UE_3$ do not need to change their GRE Tunnel ID. If the UPFs of the SMF-B2 of the $UE_2$, $UE_3$ and $UE_n$ would always accept packets from any UPF of the UPFs of the SMF-A1 then only the late notification may be feasible. This is shown in FIG. 8 as 6-2 Late Notification, meaning, for instance, that the SMF-A1 performs the relocation of the UL CL UPF as given in FIG. 2 without sending the early notification and shall send the late notification with the $UE_1$ ID and its (new or modified) local GRE Tunnel ID to the AF just after successful completion of the relocation, such as with/after the step 6 of FIG. 2.

The AF is suggested to forward this information to the SMF-B2 and the UPFs of the $UE_2$, $UE_3$, and $UE_n$ are instructed to forward their uplink traffic to the new UL CL UPF anchor of the SMF-A1.

Alternatively, instead of always keeping the AF in the path, the participating SMFs may directly signal notifications (Adding, removing, relocation of UL CL UPF anchor) to their peering SMFs. That could be allowed by the $AF_{P2P}$, when the $AF_{P2P}$ forwards the (IP) address of the control plane of the remote "SMFs" of the participating UEs. The $AF_{P2P}$ may subscribe to each of the SMF to be notified when a SMF may have changed, such that the $AF_{P2P}$ is always is aware of the responsible SMF in order to be able to terminate any UE session, if needed.

It is suggested that the $AF_{P2P}$ can request to be notified of the addition, removal, and relocation of the UL CL UPF anchor.

As might be seen in an embodiment of the present invention $AF_{P2P}$ acts as an intermediate AF between UEs. In such an embodiment, the AF request sent from the AF to the network (NW) e.g. NEF or PCF may/does not contain a DNAI. Furthermore, the notifications about the relocation and/or insertion of UPF sent from the SMF to the $AF_{P2P}$ contains multiple (e.g. GRE) IP addresses of peers whereas today only the IP address correlated to one DNAI is signaled. In another embodiment the $AF_{P2P}$ may acts as an intermediate AF between the UEs; however, there is no Application software running in the cloud handling the payload traffic of the UE traffic. Instead the traffic is directly exchanged between participating UEs. Furthermore, it is not excluded that an additional security feature is deployed as a new policy in the networks and especially in the SMF-UPF and/or SGW-C/PGW-C and SGW-U/PGW-U to accept packets from the new GRE Tunnel ID of the $UE_1$ only in case the $AF_{P2P}$ or the network policy authorized to do so. The new application function distinguishes between UE-app and UE-UE communication as it is not required that all user plane traffic is to be routed to a user plane function of an application function located in the data center, but on an application hosted e.g. on the UE.

Figure 9:
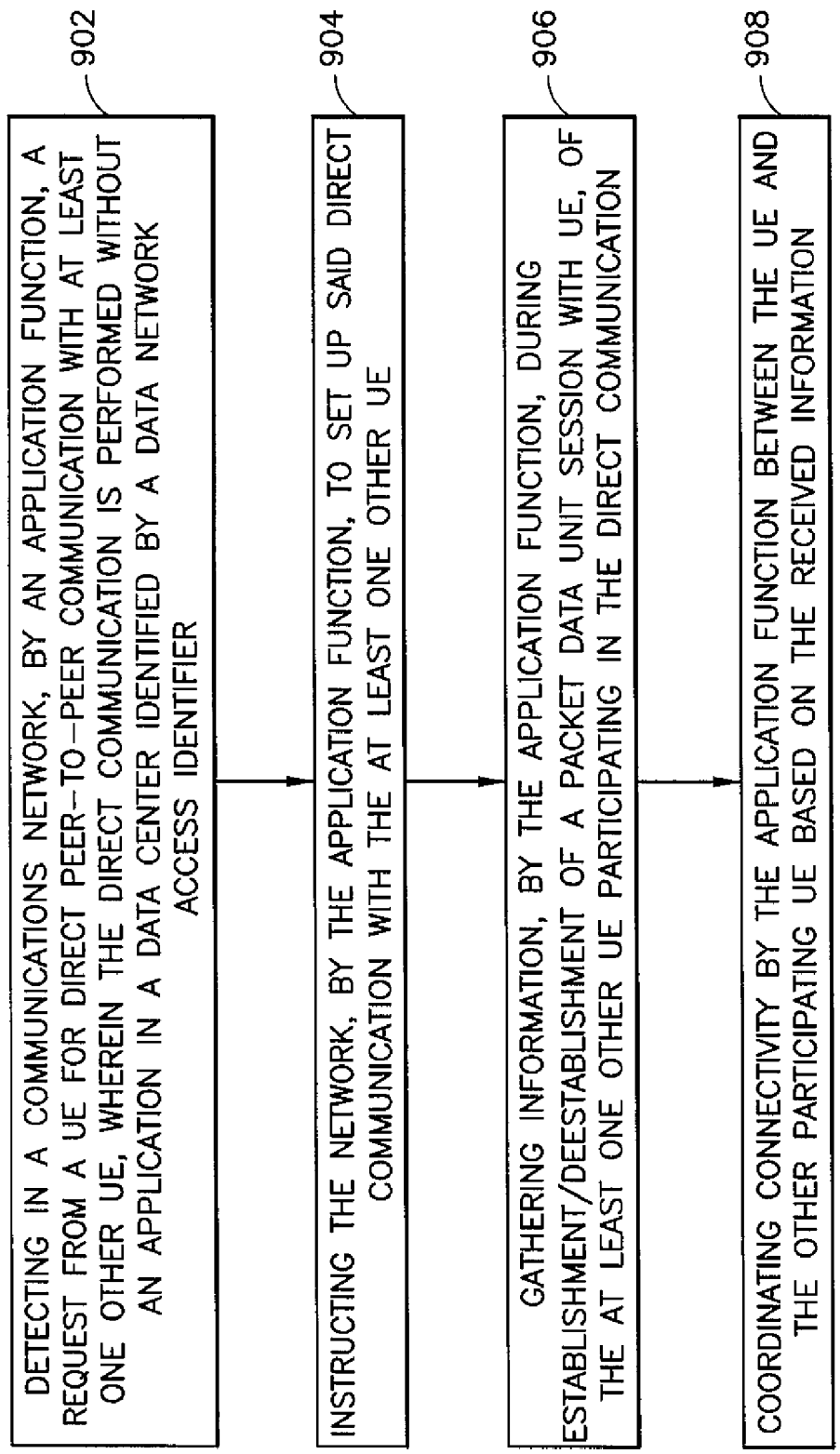
FIG. 9 is a logic flow diagram an exemplary method, a result of execution of computer program instructions embodied on a computer readable memory, functions performed by logic implemented in hardware, and/or interconnected means for performing functions in accordance with exemplary embodiment.

FIG. 9 is a logic flow diagram an exemplary method, a result of execution of computer program instructions embodied on a computer readable memory, functions performed by logic implemented in hardware, and/or interconnected means for performing functions in accordance with exemplary embodiment.

In an embodiment of an exemplary method, as shown in item 902, an application function in a communications network detects a request from a UE for direct peer-to-peer communication with at least one other UE, where the direct communication is performed without an application in a data center identified by a data network access identifier.

In item 904, the application function instructs the network to set up said direct communication with the at least one other UE.

Note that as discussed earlier, the application here, which is a peer-to-peer application function, is distinguishable from an application function used merely for an application. Specifically, this peer-to-peer or end-to-end application function, has the functionality of an application function built into it, particularly with respect to doing a handshake for instance with a 5G core network or a 4G network. Thus, from the point of view of a 5G core network, the P2P AF appears as an application function. On the other hand, from a UE's point of view, the application function appears as an application used to setup peer-to-peer connections (registration/deregistration, establishment/de-establishment).

In item 906, the application function gathers information, during establishment/deestablishment of a packet data unit session with UE, of the at least one other UE participating in the direct communication.

In item 908, the application function coordinates connectivity between the user equipment and the other participating UE based on the received information.

Although various aspects of the invention are set out in the independent claims, other aspects of the invention comprise other combinations of features from the described embodiments and/or the dependent claims with the features of the independent claims, and not solely the combinations explicitly set out in the claims.

Without in any way limiting the scope, interpretation, or application of the claims appearing below, advantages or technical effects of one or more of the exemplary embodiments disclosed herein is lower delay between participants, which avoids a placement of the $APP_{P2P}$ in a (more centralized) cloud, which lowers TCO of the operator and reduces the overall traffic in the operators network by introduction of a direct UE-UE communication without any application in the U-plane either in the network or in the data center; the application function distinguishes between UE-app and UE-UE communication and applies different UPF location procedures; and AF (or $AF_{P2P}$, respectively) will still allow to place UPFs close to the wireless ingress/egress, e.g. at eNodeBs if DNAI is being as of today, but to locate the UPFs more far away from the eNBs in case of the application is only residing on the UE, and not in the DC as in this case the saved latency (traffic is not sent up and down to/from the DC) can be utilized/translated into higher distance between peers interacting directly (without DC) with each other.

If desired, the different functions discussed herein may be performed in a different order and/or concurrently with each other. Furthermore, if desired, one or more of the above-described functions may be optional or may be combined.

An example of an embodiment of the current invention, which can be referred to as item 1, is a method that comprises detecting in a communications network, by an application function, a request from a user equipment for direct peer-to-peer communication with at least one other user equipment, where the direct communication is performed without an application in a data center identified by a data network access identifier; instructing the network, by the application function, to set up said direct communication with the at least one other user equipment; gathering information, by the application function, during establishment/deestablishment of a packet data unit session with user equipment, of the at least one other user equipment, participating in the direct communication; and based on the received information, coordinating connectivity by the application function between the user equipment and the other participating user equipment.

An example of a further embodiment of the current invention, which can be referred to as item 2, is the method of item 1, where the application function distinguishes between communication between a user equipment and an application and communication directly between a plurality of user equipment.

An example of a further embodiment of the current invention, which can be referred to as item 3, is the method of any preceding item, where the request comprises participation or withdrawal from participation in a service.

An example of a further embodiment of the current invention, which can be referred to as item 4, is the method of any preceding item, where the request comprises the relationship between the user equipment.

An example of a further embodiment of the current invention, which can be referred to as item 5, is the method of any preceding item, where the detecting comprises: receiving notification of any changes to any user plane functions; and forwarding the notification to other user plane function peers of the user plane function application.

An example of a further embodiment of the current invention, which can be referred to as item 6, is the method of item 5, where the receiving is from a first session management function.

An example of a further embodiment of the current invention, which can be referred to as item 7, is the method of any preceding item, where the instructing comprises: directing the network to select a user plane function for peer-to-peer communication while a control plane of a peer-to-peer application remains via the data center;

An example of a further embodiment of the current invention, which can be referred to as item 8, is the method of any preceding item, where the instructing further comprises: sending, by the application function, an early notification to a special application function with an identity of the user equipment and a new or modified local endpoint.

An example of a further embodiment of the current invention, which can be referred to as item 9, is the method of any preceding item, where the instructing further comprises: forwarding, by the application function, the notification to a second session management function.

An example of a further embodiment of the current invention, which can be referred to as item 10, is the method of any preceding item, where the information comprises transport endpoints related to user plane functions connected to the user equipment and the other participating user equipment.

An example of a further embodiment of the current invention, which can be referred to as item 11, is the method of any preceding item, where the information is gathered by the application function receiving a notification response from the second session management function including identity of other user equipment, old and new remote transport endpoint.

An example of a further embodiment of the current invention, which can be referred to as item 12, is the method of any preceding item, where the coordinating comprises: sending, by the application function, the notification response to the first session management function including the identity of the user equipment or the other user equipment and old or new transport endpoint.

An example of a further embodiment of the current invention, which can be referred to as item 13, is the method of items 9 or 12, where the forwarding and sending are done via a network exposure function:

An example of a further embodiment of the current invention, which can be referred to as item 14, is the method of any preceding item, where the coordinating further comprises: mediating between the user equipment and the other participating user equipment by exchanging the IDs.

An example of a further embodiment of the current invention, which can be referred to as item 15, is the method of any preceding item, further comprising: placing user plane functions within a predefined proximity of ingress/egress nodes.

An example of a further embodiment of the current invention, which can be referred to as item 16, is the method of any preceding item, where the transport endpoint is a tunnel ID.

An example of a further embodiment of the current invention, which can be referred to as item 17, is the method of any preceding item, where the transport endpoint is a Generic Routing Encapsulation Tunnel ID.

An example of another embodiment of the current invention, which can be referred to as item 18 is a computer program comprising code for controlling or performing the method of any preceding item.

An example of a further embodiment of the current invention, which can be referred to as item 19 is a computer program product comprising a computer-readable medium bearing the computer program code of item 18 embodied therein for use with a computer.

An example of a further embodiment of the current invention, which can be referred to as item 20 is a computer program product embodied on a non-transitory computer-readable medium in which a computer program is stored that, when being executed by a computer, is configured to provide instructions to control or carry out the method of any of items 1-17.

An example of another embodiment of the current invention, which can be referred to as item 21, is an apparatus comprising: means for detecting in a communications network, by an application function, a request from a user equipment for direct peer-to-peer communication with at least one other user equipment, where the direct communication is performed without an application in a data center identified by a data network access identifier; means for instructing the network, by the application function, to set up said direct communication with the at least one other user equipment; means for gathering information, by the application function, during establishment/deestablishment of a packet data unit session with user equipment, of the at least one other user equipment, participating in the direct communication; and means for coordinating connectivity by the application function between the user equipment and the other participating user equipment based on the received information.

An example of a further embodiment of the current invention, which can be referred to as item 22, is the apparatus of item 21, where the application function distinguishes between communication between a user equipment and an application and communication directly between a plurality of user equipment.

An example of a further embodiment of the current invention, which can be referred to as item 23, is the apparatus of any of items 21-22, where the request comprises participation or withdrawal from participation in a service.

An example of a further embodiment of the current invention, which can be referred to as item 24, is the apparatus of any of items 21-23, where the request comprises the relationship between the user equipment.

An example of a further embodiment of the current invention, which can be referred to as item 25, is the apparatus of any of items 21-24, where the means for detecting comprises: means for receiving notification of any changes to any user plane functions; and means for forwarding the notification to other user plane function peers of the user plane function application.

An example of a further embodiment of the current invention, which can be referred to as item 26, is the apparatus of item 25, where the receiving is from a first session management function.

An example of a further embodiment of the current invention, which can be referred to as item 27, is the apparatus of any of items 21-26, where the means for instructing comprises: means for directing the network to select a user plane function for peer-to-peer communication while a control plane of a peer-to-peer application remains via the data center;

An example of a further embodiment of the current invention, which can be referred to as item 28, is the apparatus of any of items 21-27, where the means for instructing further comprises: means for sending, by the application function, an early notification to a special application function with an identity of the user equipment and a new or modified local endpoint.

An example of a further embodiment of the current invention, which can be referred to as item 29, is the apparatus of any of items 21-28, where the means for instructing further comprises: means for forwarding, by the application function, the notification to a second session management function.

An example of a further embodiment of the current invention, which can be referred to as item 30, is the apparatus of any of items 21-29, where the information comprises transport endpoints related to user plane functions connected to the user equipment and the other participating user equipment.

An example of a further embodiment of the current invention, which can be referred to as item 31, is the apparatus of any of items 21-30, where the information is gathered by the application function receiving a notification response from the second session management function including identity of other user equipment, old and new remote transport endpoint.

An example of a further embodiment of the current invention, which can be referred to as item 32, is the apparatus of any of items 21-31, where the means for coordinating comprises: means for sending, by the application function, the notification response to the first session management function including the identity of the user equipment or the other user equipment and old or new transport endpoint.

An example of a further embodiment of the current invention, which can be referred to as item 33, is the apparatus of items 29 or 32, where the means for forwarding and sending are done via a network exposure function.

An example of a further embodiment of the current invention, which can be referred to as item 34, is the apparatus of any of items 21-33, where the means for coordinating further comprises: means for mediating between the user equipment and the other participating user equipment by exchanging the IDs.

An example of a further embodiment of the current invention, which can be referred to as item 35, is the apparatus of any of items 21-34, further comprising: placing user plane functions within a predefined proximity of ingress/egress nodes.

An example of a further embodiment of the current invention, which can be referred to as item 36, is the apparatus of any of items 21-35, where the transport endpoint is a tunnel ID.

An example of a further embodiment of the current invention, which can be referred to as item 37, is the apparatus of any of items 21-36, where the transport endpoint is a Generic Routing Encapsulation Tunnel ID.

An example of another embodiment of the current invention, which can be referred to as item 38, is an apparatus comprising: at least one processor and at least one memory including computer program code, where the at least one memory and the computer code are configured, with the at least one processor, to cause the apparatus to at least perform the following: detecting in a communications network, by an application function, a request from a user equipment for direct peer-to-peer communication with at least one other user equipment, where the direct communication is performed without an application in a data center identified by a data network access identifier; instructing the network, by the application function, to set up said direct communication with the at least one other user equipment; gathering information, by the application function, during establishment/deestablishment of a packet data unit session with user equipment, of the at least one other user equipment, participating in the direct communication; and based on the received information, coordinating connectivity by the application function between the user equipment and the other participating user equipment.

An example of a further embodiment of the current invention, which can be referred to as item 39, is the apparatus of item 38, where the application function distinguishes between communication between a user equipment and an application and communication directly between a plurality of user equipment.

An example of a further embodiment of the current invention, which can be referred to as item 40, is the apparatus of any of items 38-39, where the request comprises participation or withdrawal from participation in a service.

An example of a further embodiment of the current invention, which can be referred to as item 41, is the apparatus of any of items 38-40, where the request comprises the relationship between the user equipment.

An example of a further embodiment of the current invention, which can be referred to as item 42, is the apparatus of any of items 38-41, where the at least one memory and the computer code are configured, with the at least one processor, to further cause the detecting by the apparatus to at least perform the following: receiving notification of any changes to any user plane functions; and forwarding the notification to other user plane function peers of the user plane function application.

An example of a further embodiment of the current invention, which can be referred to as item 43, is the apparatus of item 42, where the receiving is from a first session management function.

An example of a further embodiment of the current invention, which can be referred to as item 44, is the apparatus of any of items 38-43, where the at least one memory and the computer code are configured, with the at least one processor, to further cause the instructing by the apparatus to at least perform the following: directing the network to select a user plane function for peer-to-peer communication while a control plane of a peer-to-peer application remains via the data center;

An example of a further embodiment of the current invention, which can be referred to as item 45, is the apparatus of any of items 38-44, where the at least one memory and the computer code are configured, with the at least one processor, to further cause the instructing by the apparatus to at least perform the following: sending, by the application function, an early notification to a special application function with an identity of the user equipment and a new or modified local endpoint.

An example of a further embodiment of the current invention, which can be referred to as item 46, is the apparatus of any of items 38-45, where the at least one memory and the computer code are configured, with the at least one processor, to further cause the instructing by the apparatus to at least perform the following: forwarding, by the application function, the notification to a second session management function.

An example of a further embodiment of the current invention, which can be referred to as item 47, is the apparatus of any of items 38-46, where the information comprises transport endpoints related to user plane functions connected to the user equipment and the other participating user equipment.

An example of a further embodiment of the current invention, which can be referred to as item 48, is the apparatus of any of items 38-47, where the information is gathered by the application function receiving a notification response from the second session management function including identity of other user equipment, old and new remote transport endpoint.

An example of a further embodiment of the current invention, which can be referred to as item 49, is the apparatus of any of items 38-48, where the at least one memory and the computer code are configured, with the at least one processor, to further cause the coordinating by the apparatus to at least perform the following: sending, by the application function, the notification response to the first session management function including the identity of the user equipment or the other user equipment and old or new transport endpoint.

An example of a further embodiment of the current invention, which can be referred to as item 50, is the apparatus of any of items 46 or 49, where the forwarding and sending are done via a network exposure function.

An example of a further embodiment of the current invention, which can be referred to as item 51, is the apparatus of any of items 38-50, where the at least one memory and the computer code are configured, with the at least one processor, to further cause the coordinating by the apparatus to at least perform the following: mediating between the user equipment and the other participating user equipment by exchanging the IDs.

An example of a further embodiment of the current invention, which can be referred to as item 52, is the apparatus of any of items 38-51, where the at least one memory and the computer code are configured, with the at least one processor, to further cause the apparatus to at least perform the following: placing user plane functions within a predefined proximity of ingress/egress nodes.

An example of a further embodiment of the current invention, which can be referred to as item 53, is the apparatus of any of items 38-52, where the transport endpoint is a tunnel ID.

An example of a further embodiment of the current invention, which can be referred to as item 54, is the apparatus of any of items 38-53, where the transport endpoint is a Generic Routing Encapsulation Tunnel ID.

An example of another embodiment, which can be referred to as item 55, is a computer program comprising code for controlling or performing: detecting in a communications network, by an application function, a request from a user equipment for direct peer-to-peer communication with at least one other user equipment, wherein the direct communication is performed without an application in a data center identified by a data network access identifier; instructing the network, by the application function, to set up said direct communication with the at least one other user equipment; gathering information, by the application function, during establishment/deestablishment of a packet data unit session with user equipment, of the at least one other user equipment, participating in the direct communication; and, based on the received information, coordinating connectivity by the application function between the user equipment and the other participating user equipment.

An example of a further embodiment of the current invention, which can be referred to as item 56, is a computer program product comprising a computer-readable medium bearing the computer program code of claim 55 embodied therein for use with a computer.

An example of another embodiment, which can be referred to as item 57, is a computer program product embodied on a non-transitory computer-readable medium in which a computer program is stored that, when being executed by a computer, is configured to provide instructions to control or carry out the following: detecting in a communications network, by an application function, a request from a user equipment for direct peer-to-peer communication with at least one other user equipment, wherein the direct communication is performed without an application in a data center identified by a data network access identifier; instructing the network, by the application function, to set up said direct communication with the at least one other user equipment; gathering information, by the application function, during establishment/deestablishment of a packet data unit session with user equipment, of the at least one other user equipment, participating in the direct communication; and, based on the received information, coordinating connectivity by the application function between the user equipment and the other participating user equipment.

Although various aspects are set out above, other aspects comprise other combinations of features from the described embodiments, and not solely the combinations described above. If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes examples of embodiments of the invention, these descriptions should not be viewed in a limiting sense. Rather, there are several variations and modifications which may be made without departing from the scope of the present invention as defined in the appended claims.

What is claimed is:

1. A method comprising:
    detecting in a communications network, by an application function, a request from a user equipment for direct communication with at least one other user equipment, wherein the direct communication is performed without an application in a data center identified by a data network access identifier;
    instructing the communications network, by the application function, to set up said direct communication with the at least one other user equipment;
    gathering information, by the application function, during establishment/deestablishment of a packet data unit session with the user equipment, of the at least one other user equipment, participating in the direct communication, the information at least identifying the at least one other user equipment; and
    based on the gathered information, coordinating connectivity by the application function through the communications network between the user equipment and the other participating user equipment based on information of a transport endpoint which routes traffic to or from the user equipment and the information at least identifying the at least one other user equipment.

2. The method of claim 1, wherein the detecting comprises:
    receiving notification of any changes to any user plane functions; and
    forwarding the notification to other user plane function peers of the user plane function application.

3. The method of claim 1, wherein the instructing comprises:
    directing the communications network to select a user plane function for direct communication while a control plane of an application for direct communication remains via the data center.

4. The method of claim 1, wherein the information comprises transport endpoints related to user plane functions connected to the user equipment, the other participating user equipment, or both the user equipment and the other participating user equipment.

5. The method of claim 1, wherein:
    the information is gathered by the application function at least by receiving a notification response from a session management function including identity of other user equipment, old and new remote transport endpoint; and
    the coordinating connectivity comprises sending, by the application function, the notification response to another session management function including the identity of the user equipment or the other user equipment and old or new transport endpoint.

6. The method of claim 1, further comprising: placing user plane functions within a predefined proximity of ingress/egress nodes.

7. The method of claim 1, the transport endpoint is related to a user plane function connected to the user equipment.

8. A computer program product embodied on a non-transitory computer-readable medium in which a computer program is stored that, when being executed by a computer, is configured to provide instructions to control or carry out the following:
    detecting in a communications network, by an application function, a request from a user equipment for direct communication with at least one other user equipment, wherein the direct communication is performed without an application in a data center identified by a data network access identifier;
    instructing the communications network, by the application function, to set up said direct communication with the at least one other user equipment;
    gathering information, by the application function, during establishment/deestablishment of a packet data unit session with the user equipment, of the at least one other user equipment, participating in the direct communication, the information at least identifying the at least one other user equipment; and
    based on the gathered information, coordinating connectivity by the application function through the communications network between the user equipment and the other participating user equipment based on information of a transport endpoint which routes traffic to or from the user equipment and the information at least identifying the at least one other user equipment.

9. An apparatus comprising:
    at least one processor; and
    at least one non-transitory memory including computer program code, wherein the at least one memory and the computer code are configured, with the at least one processor, to cause the apparatus to at least perform the following:
    detecting in a communications network, by an application function, a request from a user equipment for direct communication with at least one other user equipment, wherein the direct communication is performed without an application in a data center identified by a data network access identifier;
    instructing the communications network, by the application function, to set up said direct communication with the at least one other user equipment;
    gathering information, by the application function, during establishment/deestablishment of a packet data unit session with the user equipment, of the at least one other user equipment, participating in the direct communication, the information at least identifying the at least one other user equipment; and
    based on the gathered information, coordinating connectivity by the application function through the communications network between the user equipment and the other participating user equipment based on information of a transport endpoint which routes traffic to or from the user equipment and the information at least identifying the at least one other user equipment.

10. The apparatus of claim 9, wherein the application function distinguishes between communication between a user equipment and an application and communication directly between a plurality of user equipment.

11. The apparatus of claim 9, wherein the request comprises the relationship between the user equipment.

12. The apparatus of any of claim 9, wherein the at least one memory and the computer code are configured, with the at least one processor, to further cause the apparatus to at least perform the following:

receiving notification of any changes to any user plane functions; and forwarding the notification to other user plane function peers of the user plane function application.

13. The apparatus of claim 12, wherein the receiving is from a session management function.

14. The apparatus of claim 13, wherein the at least one memory and the computer code are configured, with the at least one processor, to further cause the instructing by the apparatus to at least perform the following:

forwarding, by the application function, the notification to a another session management function.

15. The apparatus of claim 9, wherein the at least one memory and the computer code are configured, with the at least one processor, to further cause the instructing by the apparatus to at least perform the following:

directing the communications network to select a user plane function for direct communication while a control plane of an application for direct communication remains via the data center.

16. The apparatus of claim 9, wherein the at least one memory and the computer code are configured, with the at least one processor, to further cause the instructing by the apparatus to at least perform the following:

sending, by the application function, an early, notification to a special application function with an identity of the user equipment and a new or modified local endpoint.

17. The apparatus of claim 9, wherein the information comprises transport endpoints related to user plane functions connected to the user equipment the other participating user equipment, or both the user equipment and the other participating user equipment.

18. The apparatus of claim 9, wherein the information is gathered by the application function receiving a notification response from a session management function including identity of other user equipment, old and new remote transport endpoint.

19. The apparatus of claim 18, wherein the at least one memory and the computer code are configured, with the at least one processor, to further cause the coordinating by the apparatus to at least perform the following:

sending, by the application function, the notification response to another session management function including the identity of the user equipment or the other user equipment and old or new transport endpoint.

20. The apparatus of claim 9, wherein the at least one memory and the computer code are configured, with the at least one processor, to further cause the apparatus to at least perform the following:

placing user plane functions within a predefined proximity of ingress/egress nodes.

\* \* \* \* \*